United States Patent [19]

DeLange

[11] Patent Number: 4,538,840

[45] Date of Patent: Sep. 3, 1985

[54] CONNECTOR MEANS FOR USE ON OIL AND GAS WELL TUBING OR THE LIKE

[76] Inventor: Richard W. DeLange, 13011 Northborough, Apt. 312, Houston, Tex. 77067

[21] Appl. No.: 454,964

[22] Filed: Jan. 3, 1983

[51] Int. Cl.³ ............................................. F16L 25/00
[52] U.S. Cl. .................................. 285/333; 285/369; 285/383
[58] Field of Search ............... 285/333, 334, 355, 390, 285/369, 383

[56] References Cited

U.S. PATENT DOCUMENTS

| | | |
|---|---|---|
| 2,006,520 | 7/1935 | Stone et al. . |
| 2,980,451 | 4/1961 | Taylor et al. . |
| 3,047,316 | 7/1962 | Wehring et al. . |
| 3,489,437 | 1/1970 | Duret .............................. 285/355 X |
| 3,572,777 | 3/1971 | Blose .................................... 285/334 |
| 4,244,607 | 1/1981 | Blose .............................. 285/334 X |
| 4,377,302 | 3/1983 | Kohyama ............................ 285/390 |
| 4,433,862 | 2/1984 | Raulins et al. ...................... 285/355 |

FOREIGN PATENT DOCUMENTS 2438387 2/1976 Fed. Rep. of Germany ...... 285/333

Primary Examiner—Dave W. Arola
Attorney, Agent, or Firm—Haverstock, Garrett & Roberts

[57] ABSTRACT

Connector means for joining together two adjacent pipe members in a fluid/pressure tight relationship comprising an externally threaded male element cooperatively engageable with an internally threaded female element, the male and female elements each respectively including three adjacent complementary annular sealing surfaces positioned axially adjacent the threaded portion associated respectively therewith, the three adjacent complementary sealing surfaces being arranged in an irregular pattern such that when the male and female elements are threadingly secured together, the three adjacent sealing surfaces associated respectively with the male and female elements sealingly engage one another to form three independent adjacent pressure-tight seals. The sealing arrangement of the present invention is ideally suited for use on both an integral joint system and on a coupled joint system and may be arranged and located in the particular connection so as to form an internally shouldered connection and/or externally shouldered connection.

14 Claims, 6 Drawing Figures

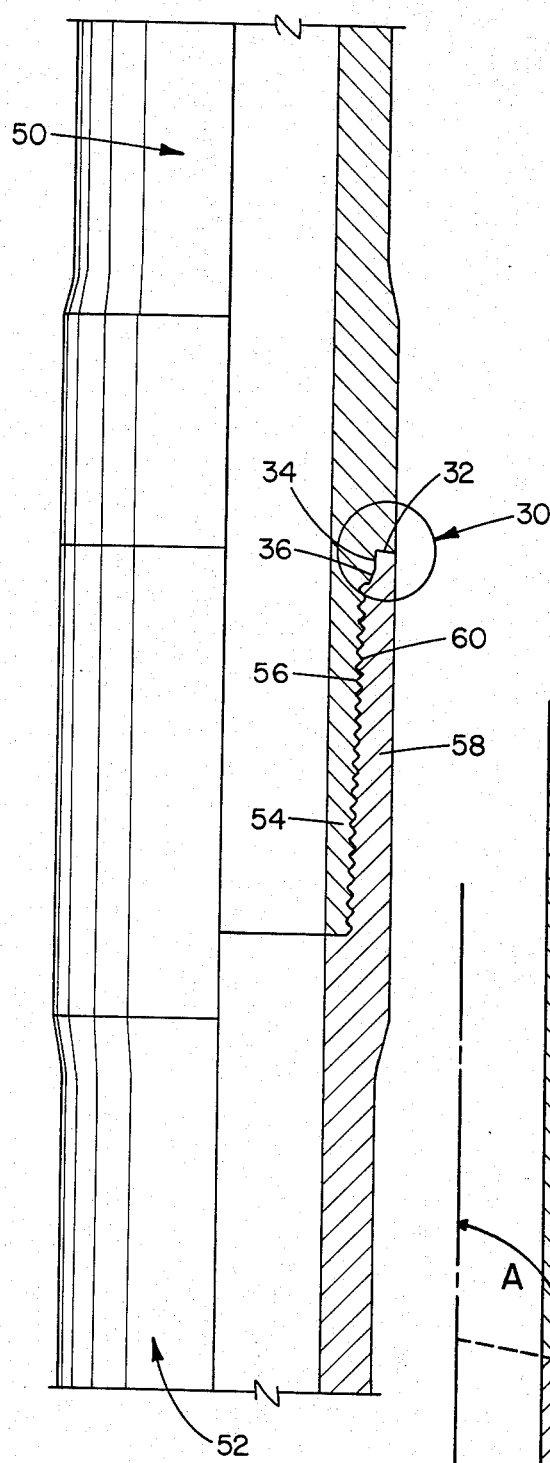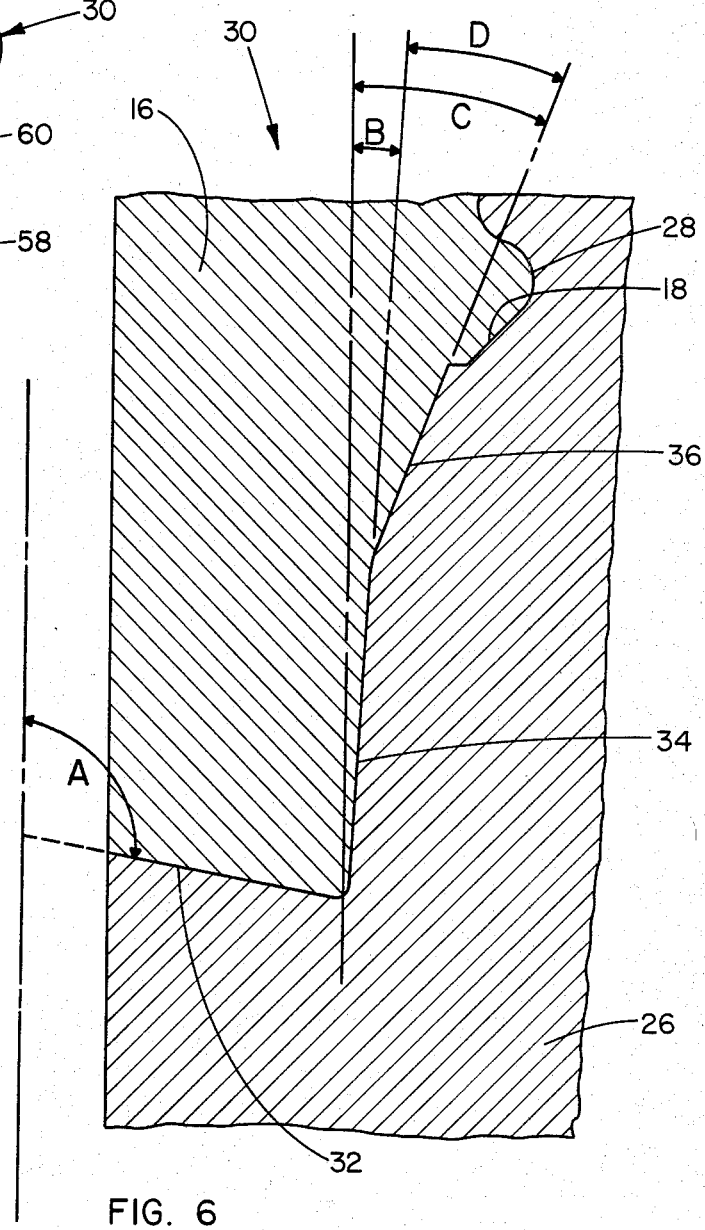
FIG. 4
FIG. 6

CONNECTOR MEANS FOR USE ON OIL AND GAS WELL TUBING OR THE LIKE

The present invention relates to a joinder means for use in connecting together oil and gas well tubing and/or casing and, more particularly, to several embodiments of a joinder arrangement wherein three independent adjacent metal-to-metal pressure seals are utilized as the primary sealing means to assure a pressure-tight joint when the male and female elements of the connection are properly secured together. The present sealing arrangement is ideally suited for use as a premium connector and provides a multiple sealing system which ensures maximum sealing integrity. Although the present sealing arrangement is primarily designed for use in connecting together oil and gas well tubing and/or casing, the present sealing arrangement is likewise adaptable for use in a multiplicity of other pipe joinder applications.

BACKGROUND OF THE INVENTION

The oil and gas industry has been continually drilling wells deeper and deeper into extremely high underground pressure areas or zones, which zones many times contain hostile and corrosive chemicals such as hydrogen sulfide. To complete a well for oil and/or gas production normally requires cementing casing in the well hole to prevent cave-ins and other phenomenon both during and after the drilling operation. Once the casing is positioned within the well hole, tubular pipes of reduced diameter, commonly known as tubing, are positioned within the well casing and extend the full length thereof for effectively carrying the hydrocarbons and gases contained within the production formation to the surface. These tubular pipes or tubing are manufactured by steel mills in average lengths of approximately 30 to 40 feet and therefore must be connected or joined together as they are lowered into the well by means of mechanical connector devices. Connectors for the tight joinder of such well tubing are well known in the petroleum industry. These connectors perform many functions but their primary function is essentially twofold, namely, (1) to adequately hold the string of pipes together within the well hole and (2) to adequately seal the connected together tubular members against the internal and/or external pressures commonly associated with drilling for and pumping oil and/or gas. Hereinbefore, pressure seals were simply created by interference fit of the male and female threads associated with the respective tubing to be joined. Such joinder means generally comprises a male extremity or pin associated with one tube element and a female extremity or box associated with the other tube element, each of which is respectively fitted with corresponding threads such that when the male extremity is threadingly positioned into the female extremity, the locking of said threads occurs. This joinder method became inadequate for many wells when well depths reached approximately 10,000 feet due primarily to the higher pressures associated with the oil and gas formations found at such depths. These related higher pressures have therefore produced a need for connectors or connecting means having a pressure sealing ability capable of adequately withstanding both the internal and external pressures associated with such well depths.

Metal-to-metal pressure seals were first successfully introduced into the oil and gas industry by the Hydril Company based upon Stone U.S. Pat. No. 2,006,520. The seal disclosed in the Stone patent was based upon a wedged fit between a seal surface on the male extremity or pin and a corresponding seal surface associated with the female extremity or box, which surfaces engaged just prior to shouldering. Although this sealing arrangement provides an effective seal, it functions without any back-up sealing means in case of failure, a feature necessary for maximum sealing integrity in today's deep well environment. In addition, the sealing arrangement of Stone is also very susceptible to handling damage due to its location on the connector. If the seal element surfaces are even slightly scratched or otherwise damaged, the seal will not seat properly and the gas and/or oil pressures generated during drilling and pumping operations will easily move past the seal area and into the connector body where such pressure will eventually or immediately cause failure. Long term storage of the known prior art connectors also causes problems in that such storage causes the sealing surfaces to deteriorate due to pitting and other corrosion, all of which cause deterioration of the sealing capability of the connector. Such failures cannot be tolerated not only because they are very expensive but also, and more importantly, because they are extremely dangerous to the lives of those working in the area of the well.

A successful incorporation of two adjacent metal seals in a coupling device was marketed by Vallourec Steel and is disclosed in Duret U.S. Pat. No. 3,489,437. This sealing arrangement has been fairly successful except that, again, it is highly susceptible to damage during normal field handling and during running operations. For example, if the double seal surfaces of Duret are even slightly dented, nicked, or galled prior to make-up of the connention, such defects will cause the pressure seals formed by the mating of said seal surfaces to deteriorate and the associated pressures will again migrate through the seal area causing leakage and/or joint failure. In addition, the Duret sealing configuration is extremely sensitive to leakage and/or failure due to the sharpness of the angles of the seal element surfaces relative to the longitudinal axis of the pipe. For example, if any foreign matter, no matter how small, is trapped between the seal surfaces during make-up, the respective seals will not seat properly and therefore will not provide an adequate pressure seal. Because of its sensitivity and suspectibility to improper seating due to damage caused during field handling, stabbing, and other phases of a drilling operation, this sealing arrangement is not widely utilized in the United States.

It rapidly became apparent that back-up seal elements were necessary for insurance against pressure leaks and the often resulting connector failures associated therewith. Many independent sealing devices such as rings and gaskets have been utilized as both back-up and primary seals. The two most effective seals in use today utilize teflon seal elements trapped or at least partially trapped in the joinder connection so as to block any pressure from migrating therethrough. These seals were marketed by Atlas Bradford of N. L. Industries, Inc. and are disclosed in Taylor U.S. Pat. No. 2,980,451 and Wehring U.S. Pat. No. 3,047,316. These sealing rings and/or gaskets have served well as back-up sealing elements. However, the effectiveness of such sealing means has deteriorated within the last ten years due to the fact that oil and gas well drillings have reached well depths far beyond 10,000 feet and, in addition, drilling to such depths has exposed the well tubing and its connections to many corrosive elements such as hydrogen sulfide. As a result, seal failures have also occurred due to the corrosive effect of hydrogen sulfide. Most hydrogen sulfide failures are associated with high stress levels in the metal connectors. The teflon seal rings generate very high stress levels during make-up of the connection in order to obtain an adequate pressure sealing barrier and therefore are highly susceptible to such corrosive failure. In addition, replacement of one or more defective sealing rings is extremely time consuming and costly since the defective portion of the string of pipe must be tripped out of and then back into the well hole. This problem is accented in the international marketplace where stocking of replacement parts is always a problem and very expensive.

Consequently, no known joinder means utilized in drilling operations for connecting together a series of tubular pipes incorporates an adequate combination of pressure seals for ensuring maximum sealing integrity at all times. In addition, none of the known prior art devices are as effective and reliable as the present construction and none utilizes a sealing arrangement which is not easily destroyed or neutralized by damage or other defects arising during storage, normal field handling, stabbing and running operations, or any other drilling activity.

SUMMARY OF THE INVENTION

The present connector means overcomes many of the disadvantages and shortcomings associated with known pipe joinder means, and teaches the construction and operation of several embodiments of an improved connector means for coupling together tubular pipes, in particular, tubular pipes used in well drilling operations which are subjected to substantial pressures, corrosive chemicals, physical stresses and construction hazards as the depth of the wells go deeper and deeper. The connector means of the present invention comprises a sealing arrangement wherein three independant adjacent metal-to-metal pressure seals are formed whenever the male and female elements of the subject connection are properly made-up power-tight. In particular, the male element of the present construction includes an externally threaded extremity or pin portion having an unthreaded annular section positioned axially forward of the male threaded area. This unthreaded section lies substantially adjacent the terminal end of the pin and includes three adjacent sealing surfaces. Similarly, the female element of the present construction includes an internally threaded extremity or box portion having a corresponding unthreaded annular section positioned axially rearward of the female threaded area. The unthreaded section of the female extremity likewise includes three complementary adjacent annular sealing surfaces such that when the pin and box portions of the subject connector are threadedly secured together, the three sealing surfaces associated respectively therewith sealingly engage one another thereby forming three independent adjacent positive metal-to-metal pressure seals. The three adjacent pressure seals of the present invention are likewise arranged in an irregular pattern relative to each other so as to provide maximum resistance to pressure leakage due to damage, distortion, or failure of any two pressure seals in the subject seal group. Therefore, even if two of the three independent sealing surfaces associated with the male and female elements of the present connector means are damaged thereby preventing the sealing surfaces from properly seating, the remaining pressure seal in the subject seal group will still seat properly and prevent leakage. Additionally, the sealing surfaces forming the third pressure seal of the present invention are so positioned relative to the adjacent sealing surfaces as to substantially negate the possibility of damage thereto thereby effectively ensuring at least one pressure-tight seal at all times.

The sealing arrangement of the present invention is ideally suited for use on both an integral joint system and on a coupled joint system and additional seals may likewise be integrated into the subject connection without negating the proprietary nature of the invention. The subject seal group may likewise be utilized as a sealing system for constraining both internal and external pressures, depending upon the position and location of the seal group in the connection.

It is therefore a principal object of the present invention to provide improved means for sealing between adjacent connected together pipe members, particularly, pipe members used in oil and gas well drilling and production operations.

Another object is to provide a multiple sealing system which effectively eliminates leakage problems at the points of joinder between adjacent pipes.

Another object is to provide a multiple sealing system which ensures maximum sealing integrity at the points of joinder between adjacent pipes.

Another object is to provide an improved pressure seal wherein the sealing arrangement includes three independent adjacent pressure seals.

Another object is to provide an improved connector means wherein the three independent adjacent pressure seals are arranged in an irregular pattern relative to each other so as to provide a redundant sealing system.

Another object is to provide an improved pressure seal arrangement wherein the sealing surfaces associated with at least one of said pressure seals are so positioned as to substantially negate the possibility of damage thereto during make-up of the joint connection.

Another object is to teach the construction of a multiple sealing system which includes three adjacent positive metal-to-metal pressure seals adaptable for use in all well casing and tubing applications.

Another object is to provide improved connector means wherein the seal group placement is designed to accept normal field handling without undue damage.

Another object is to provide an improved pressure seal group which remains pressure-tight after repeated make-up and break-out of the seal arrangement.

Another object is to teach the construction of an improved pressure sealing arrangement exhibiting repeatable sealing capability.

Another object is to provide joinder means for pipes that provide a premium seal therebetween without the use of additional sealer materials or other substances.

Another object is to provide an improved pressure sealing arrangement which is streamlined in construction to facilitate the well running operation.

Another object is to teach the construction and operation of a multiple sealing system adaptable for use in both an integral joint connection and a coupled joint connection.

These and other objects and advantages of the present invention will become apparent to those skilled in the art after considering the following detailed specification which discloses several representative embodiments of the present pipe joining and sealing means in conjunction with the accompanying drawings.

BRIEF DESCRIPTION OF THE DRAWINGS

FIG. 4 is a partial cross-sectional view similar to FIG. 2 showing another embodiment for sealingly connecting together two adjacent pipes, said joinder means disclosing an externally shouldered connection;

FIG. 6 is an enlarged partial cross-sectional view of the sealing arrangement illustrated in FIGS. 1-5.

DETAILED DESCRIPTION OF THE INVENTION

Figure 1:
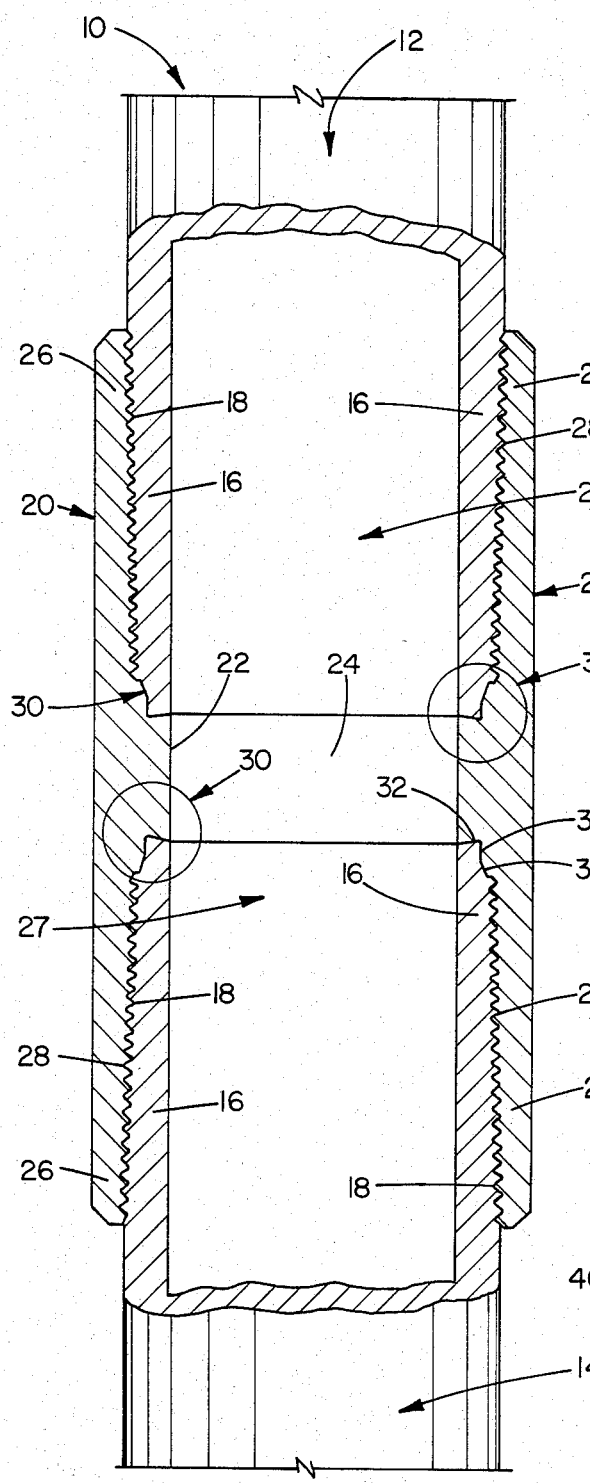
FIG. 1 is a partial cut-away cross-sectional view showing portions of two adjacent pipes connected together according to the teachings of one embodiment of the present invention.

Referring to the drawings more particularly by reference numbers wherein like numerals refer to like parts, the number 10 in FIG. 1 illustrates a portion of two adjacent tubular pipes 12 and 14 constructed and connected together in fluid/pressure tight relationship with each other according to the teachings of one embodiment of the present invention. The sealing means 30 employed by the present invention comprises a positive metal-to-metal pressure sealing system which includes three separate adjacent sealing surfaces integrally formed adjacent one end portion of the male element of the present joinder means and a corresponding sealing surface arrangement integrally formed adjacent one end portion of the female element of the present joinder means, said complementary sealing surfaces being cooperatively engagable with each other whenever the male and female elements of the present connection are properly secured together. The multiple sealing system 30 of the present invention produces three independent adjacent pressure seals positioned and arranged in an irregular pattern so as to achieve maximum sealing integrity at all times as best illustrated in FIG. 6.

In the preferred embodiment as shown in FIG. 1, the present pipe joinder means is utilized in a coupled joint arrangement wherein two male elements are joined together by means of a female coupling device 20. In particular, the pipes 12 and 14 each include a male extremity or pin portion 16, each pin portion 16 including a tapered externally threaded surface area such as the threaded portion 18. Each pin portion 16 also includes an unthreaded portion as shown at 30, said unthreaded portion being positioned axially forward of the threaded area 18 and including the three adjacent sealing surfaces of the present invention as will be hereinafter more fully described. A coupling connector 20 in the form of a double female sleeve member is utilized to sealingly connect together the respective pin portions 16 of the adjacent pipe members 12 and 14. The coupling 20 is unitary in construction and includes an annular portion 22 having an opening 24 extending therethrough adaptable to communicate with the fluid opening extending through the respective pipe members 12 and 14. Although the size of the opening 24 need not correspond to the size of the fluid opening extending through the pipes 12 and 14, it is generally preferred that the diameter of the opening 24 correspond substantially to the inner diameter of the tubular members 12 and 14 so as not to interfer with or otherwise restrict the flow of fluid or gas therethrough.

The coupling or collar 20 also includes an elongated annular flange or box portion 26 extending outwardly away from the annular portion 22 on each opposite side thereof, each annular flange 26 forming a cavity 27 adaptable for receiving the pin 16 of the pipes 12 and 14. Each cavity 27 lies in communication with the opening 24 and each flange 26 is provided with a tapered internally threaded surface area 28 extending circumferentially along the inside portion thereof adaptable to threadingly engage the threaded portion 18 of the pipes 12 and 14. Each flange 26 also includes a corresponding unthreaded portion positioned axially rearward of the threaded area 28, said unthreaded portion likewise including three complementary sealing surfaces adapted to mate with and engage the corresponding sealing surfaces associated with the male pin 16 as shown at 30. Although the tapered shape of the threaded areas 18 and 28 allows easier introduction of the male pin 16 into the female box 26 and reduces the possibility of damage to the female threads 28 during assembly of the connection, it is recognized that any thread form including non-tapered threads may be utilized in the present invention. For example, the mating threaded areas 18 and 28 may be either straight or tapered, they may possess radial clearance or tightness, and their dimensional requirements may assume a wide variety of shapes and sizes.

The seal arrangement 30 of the present invention is accomplished by positioning one group of three adjacent sealing surfaces axially forward of the male threaded area 18 adjacent the terminal end of pin member 16 and positioning a second complementary group of three adjacent sealing surfaces axially rearward of the female threaded area 28 such that when the male and female elements 16 and 26 are threadedly engaged, the respective sealing surfaces mate with and engage one another so as to form three adjacent independent metal-to-metal pressure seals as shown at 30 in FIGS. 1 and 6. Each seal surface group arrangement associated with the male and female elements of the present invention includes a first annular sealing surface 32 positioned such that the plane of the surface 32 forms the angle A with a plane positioned parallel to the longitudinal axis of the pipes to be joined together (FIG. 6), the angle A being generally in the range from between approximately 90° to 125°. When the male and female elements 16 and 26 respectively are threadingly engaged and made-up power-tight, the respective surfaces 32 are placed in sealing abutment with each other thereby forming the first pressure seal of the present invention. The sealing surface or shoulder 32 associated with the female element 26 limits the axial travel of the male element 16 into the internal threaded cavity 27 of the female element 26 and serves as the primary torque generator so important for ensuring that the joint connection will not vibrate apart during running and pumping operations. Although it is generally preferred that the angle A be in the range from about 90° to 125°, positioning of the seal surfaces 32 such that the angle A is greater than 125° may also provide suitable results so long as the size of the angle A permits a disengageable connection between the elements 16 and 26 in spite of the friction generated at the zone of abutment.

Each seal surface group associated with the seal arrangement 30 includes a second annular sealing surface 34 positioned adjacent the first sealing surface 32 such that the plane of the surface 34 lies in a plane substantially parallel to the longitudinal axis of the pipes to be joined together (FIG. 6). When the male and female elements 16 and 26 respectively are threadingly secured and made-up power-tight, the sealing surfaces 34 form the second adjacent positive metal-to-metal pressure seal of the present invention. This pressure seal is a flank seal or an extremely low angle seal in comparison to the first positive pressure seal formed by the sealing surfaces 32. It is important that the second seal formed by the mating surfaces 34 lie substantially parallel to the longitudinal axis of the connected pipe so that a slight stand-off of the first pressure seal formed by the sealing surfaces 32, which stand-off may be caused by the trapping of foreign material therebetween or other damage to the surfaces 32, will not neutralize and/or eliminate the sealing capability of the second pressure seal. Normally, the threads 18 and 28 associated with the male and female elements are on such a slight tapered angle that the sealing surfaces 34 can be machined so as to form the angle B with a plane positioned parallel to the longitudinal axis of the connected pipe, the angle B being in the range from between approximately 1° to 5°, although slightly greater angles up to approximately 20° may likewise be utilized. However, it should be noted that as the angle B between the sealing surfaces 34 and the longitudinal axis of the connected pipe increases, the second pressure seal formed by the engagement of the surfaces 34 becomes more sensitive in that any stand-off associated with the first sealing surfaces 32 may cause a corresponding stand-off of the second sealing surfaces 34. This may produce some deterioration of the sealing capability of the second pressure seal, which problem can be avoided by positioning the sealing surfaces 34 such that the angle B is in the range of about 1° to 5°. In this situation, even if the first sealing surfaces 32 are damaged or otherwise defective prior to joinder, the relatively small inclination of the sealing surfaces 34 relative to the longitudinal axis of the connected pipe (angle B) still allows generation of the second pressure seal even if the damage to the first sealing surfaces 32 restricts make-up of the connection. The second pressure seal therefore acts as a back-up seal and ensures seal integrity between the first and second pressure seals.

Each seal surface group associated with the seal arrangement 30 also includes a third annular sealing surface 36 positioned adjacent the second sealing surface 34 such that, when mated together in abutting relationship as previously described, the sealing surfaces 36 form the third adjacent positive metal-to-metal pressure seal of the seal arrangement 30 (FIG. 6). The complementary sealing surfaces 36 are positioned such that they form the angle C with a plane positioned parallel to the longitudinal axis of the connect pipe, the angle C being greater than the angle B as shown in FIG. 6. It is important that the sealing surfaces 36 be machined on an angle greater than the inclination of the sealing surfaces 34 so that a third adjacent independent pressure seal is generated. Since the sealing surfaces 32 and 34 are most susceptible to damage during normal field handling and installation, this third pressure seal provides a still further back-up seal in the event that both the first and second seals formed by the surfaces 32 and 34 lose their sealing capability. Since this third pressure seal is positioned axially directly behind and adjacent the first and second pressure seals of the seal group 30 and the seal surfaces 36 are inclined away from the sealing surfaces 32 and 34, the surfaces 36 are substantially less susceptible to damage prior to joinder. The seal arrangement 30 therefore provides a multiple redundant sealing system which maximizes the sealing integrity of the joint and increases its reliability even after repeated make-up and break-out of the joint. Although any inclination of the sealing surfaces 36 greater than the inclination of the sealing surfaces 34 will produce satisfactory sealing capability, it is generally preferred that the inclination of the surfaces 36 relative to the surfaces 34, namely, angle D (FIG. 6), be in the range from approximately 10° to 75°.

Figure 2:
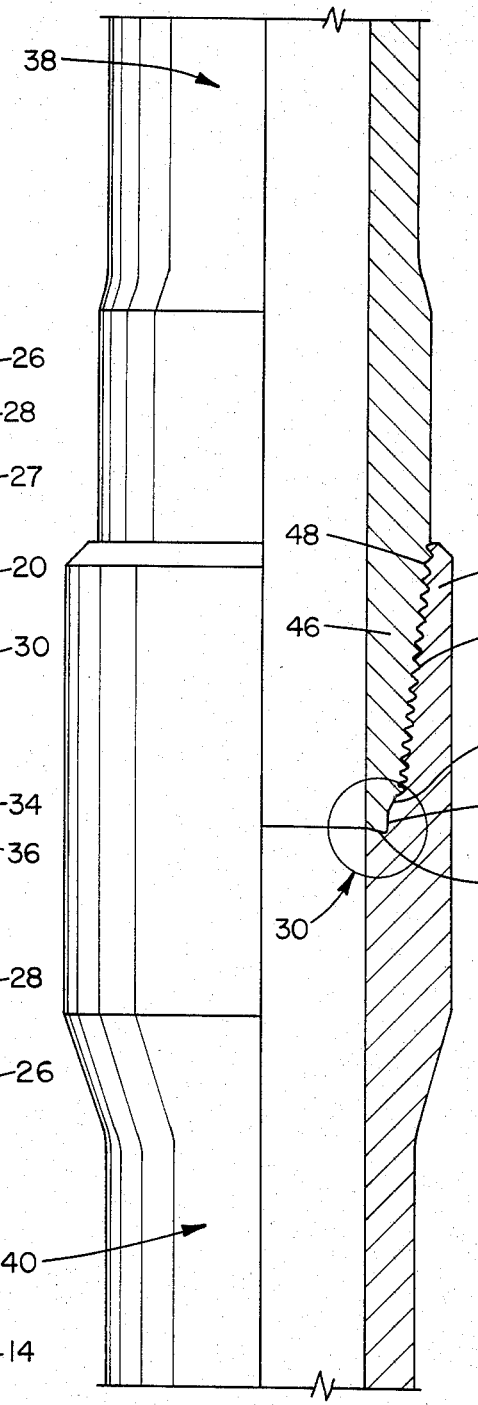
FIG. 2 is a partial cross-sectional view showing an alternative embodiment for sealingly connecting together two adjacent pipes, said joinder means disclosing an internally shouldered connection.
Figure 3:
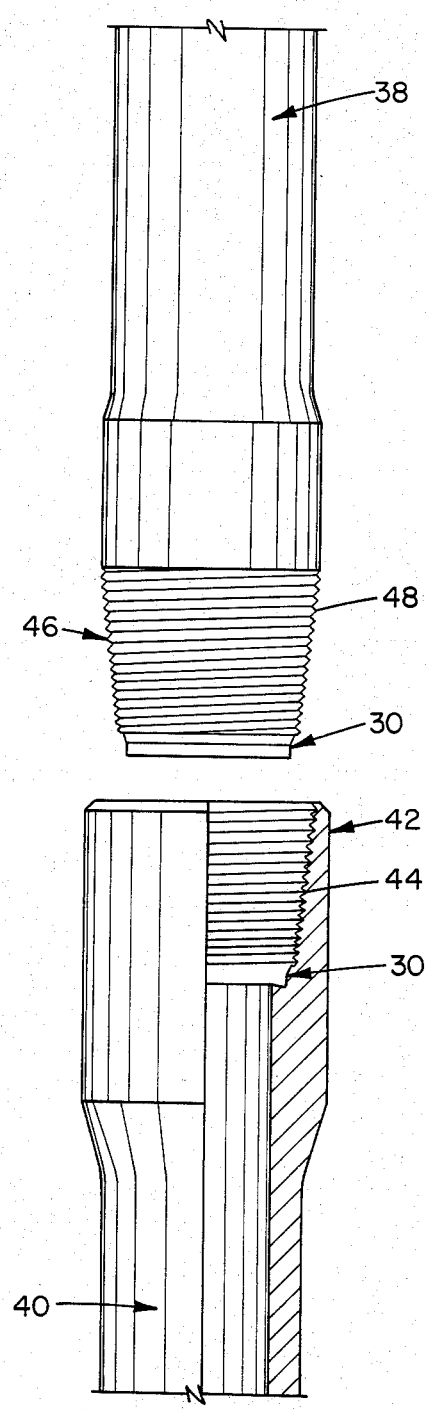
FIG. 3 is an exploded side elevational view of portions of two adjacent pipes utilizing the connector means shown in FIG. 2.

The seal arrangement 30 of the present invention is likewise easily adaptable for use on an intergal joint system as shown in FIGS. 2-4. FIGS. 2 and 3 illustrate the connecting together of two adjacent pipes 38 and 40 wherein the female extremity or box portion 42 is intergally formed on one end portion of the pipe 40 and includes an internally threaded area 44 adaptable for threadingly receiving the externally threaded area 48 associated with the pin portion 46 of the adjacent pipe 38. The pin 46 and the box 42 are constructed and connected together in a manner substantially similar to the construction and joinder of the pin 16 and the box 26 (FIG. 1) and each includes the three adjacent sealing surfaces 32-36 as previously described. When the pipes 38 and 40 are properly made-up power-tight, the respective sealing surfaces 32-36 associated with the pin 46 sealingly mate with the complementary surfaces 32-36 associated with the box 42 to produce the seal arrangement 30 of the present invention. Incorporation of the female extremity or box 42 on one end portion of the pipe 40 eliminates the need of an additional coupling member such as the coupling connector 20. It should be noted that since the seal group 30 shown in FIGS. 1 and 2 lies adjacent to the inner diameter of the connected pipes, this connection is known as an internally shouldered connection and is ideally suited for controlling and sealing internal pressure within the string of pipes.

FIG. 4 illustrates an intergral joint connection similar to the connection disclosed in FIGS. 2 and 3 wherein the mating together of adjacent pipes 50 and 52 produces an externally shouldered connection. In particular, the pipe 50 includes an externally threaded extremity or pin portion 54 having the three annular sealing surfaces 32-36 positioned axially rearward of the male threaded area 56 as shown at 30. Correspondingly, the pipe 52 includes an internally threaded extremity or box portion 58 having complementary sealing surfaces 32-36 positioned axially forward of the female threaded area 60 substantially adjacent the terminal end of the female extremity or box 58. In this arrangement, when the male and female extremities 54 and 58 respectively are properly threadedly secured, the seal group 30 of the present invention is formed adjacent the external surface of the pipes 50 and 52 thereby producing an externally shouldered connection. In comparison to the internally shouldered connection illustrated in FIGS. 1-3, the externally shouldered connection of FIG. 4 is ideally suited for controlling and sealing external pressure. With respect to the coupling arrangement illustrated in FIG. 1, it is also anticipated that the pin 16 and box 26 can likewise be constructed to form an externally shouldered connection as illustrated in FIG. 4.

Figure 5:
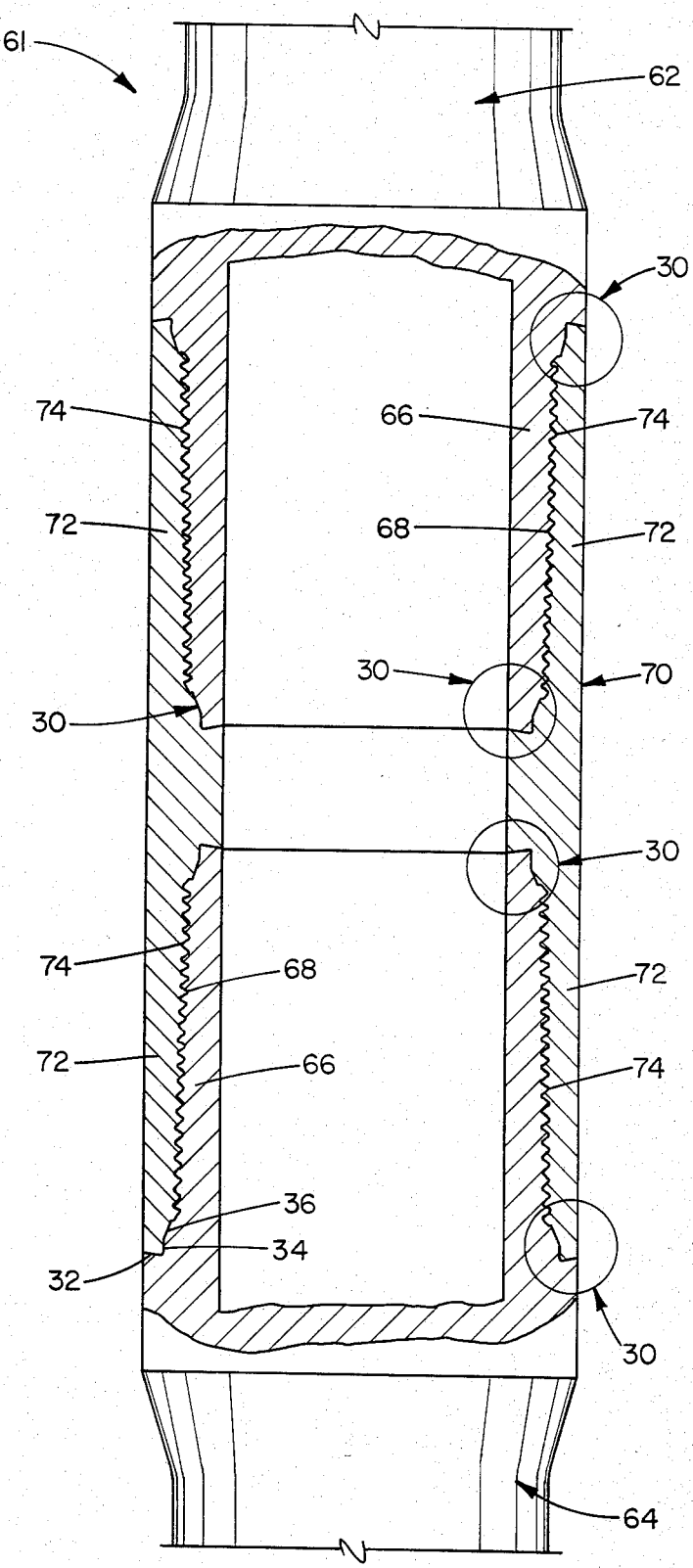
FIG. 5 is a partial cut-away cross-sectional view similar to FIG. 1 showing still another embodiment for sealingly connecting together two adjacent pipes, said joinder means disclosing both an internally and an externally shouldered connection.

FIG. 5 illustrates another coupled joint connection 61 similar to the connection disclosed in FIG. 1 wherein the mating together of adjacent pipes 62 and 64 produces both an internally and an externally shouldered connection. In the embodiment of FIG. 5, the pipes 62 and 64 each include an externally threaded extremity or pin portion 66 having the three annular sealing surfaces 32-36 of the present invention positioned and arranged axially adjacent both opposite ends of the male threaded portion 68 as shown at 30. Correspondingly, the coupling connector 70 includes an internally threaded extremity or box portion 72 on each ooppsite end thereof substantially similar to the construction of the coupling connector 20 (FIG. 1). Each box portion 72 likewise includes complementary sealing surfaces 32-36 positioned and arranged axially adjacent both opposite ends of the female threaded portion 74 as also shown at 30. In this arrangement, when the male and female extremities 66 and 72 respectively are properly threadedly secured as previously described, the seal group 30 of the present invention is formed adjacent the inner diameter of the connected pipes 62 and 64 thereby producing an internally shouldered connection adjacent the terminal end of the respective male pin portions 66, and the present seal group 30 is also formed adjacent the external surface of the pipes 62 and 64 thereby producing an externally shouldered connection adjacent the terminal end of the respective female box portions 72. The coupled joint arrangement 61 therefore produces both an internally and an externally shouldered connection and is ideally suited for simultaneously controlling and sealing both internal and external pressures.

As can be seen, the sealing arrangement 30 of the present invention provides a multiple redundant sealing system which ensures maximum sealing integrity of the made-up joint at all times, even when some of the sealing surfaces experience damage or are otherwise defective. As previously explained, the sealing surfaces 32-36 are specifically positioned as hereinbefore described so as to protect each other from possible damage during running operations just prior to make-up. There are basically two types of possible damage which may occur to the sealing surfaces 32-36 during running operations, namely, axial impact damage and radial impact damage. Either type of damage will cause a cut, dent or other deformation to the sealing surfaces which may cause deterioration of the seal formed by the damaged sealing surfaces. The positioning and inclination of the sealing surfaces 36 associated with the seal arrangement 30 is specifically designed to substantially negate the possibility of damage thereto during running operations thereby ensuring at least one pressure-tight seal at all times. In particular, the sealing surfaces 36 are less susceptible to radial impact damage due to the fact that they are positioned sufficiently axially rearward with respect to the sealing surfaces 34 so as to protect them from radial damage. In addition, the sealing surfaces 32 and 34 both protect the surfaces 36 from axial impact damage. Additionally, the sealing capability of the sealing surfaces are often times neutralized due to corrosion which often develops from trapped moisture during storage. The present sealing arrangement 30 substantially reduces this occurrence since corrosion would have to attack and neutralize all three sealing surfaces 32-36. Therefore, the present invention produces a seal arrangement 30 which provides adequate redundancy in the sealing system to allow seal generation even if damage to the connection occurs prior to make-up of the joint connection.

It is important to note that in order to machine a group of complementary sealing surfaces such as the surfaces 32, 34, and 36 so that all such surfaces engage in sealing relationship with each other when mated together requires a machine tool or lathe capable of fabricating parts to tolerances tighter than ±0.001 inches. Similarly, it should be noted that the complementary threads 18 and 28 should be free of any defects which may break their continuity. Thread defects include imperfections such as visible tears, cuts, grinds, shoulders, or any other discontinuity such as seams, overlapps, pits, tool marks, dents, handling damage and so forth. In addition, the pin and box threads should be of such form and finish and should be machined uniformly within the specified limits to assure interchangability and the ability to withstand power make-up and break-out without injury to the threads or the seal surfaces associated with either member. The threads 18 and 28 and the respective sealing surfaces 32, 34 and 36 should likewise be treated so as to minimize galling and maximize the leak resistant characteristics of the joint. For example, the mating threads and the sealing surfaces may be coated with manganese phosphate or moly-disulfide or they may be plated with zinc, chrome or any other surface treatment. In addition, the pin shoulders and box faces should be free of any defects which would cause a false stand-off of the joint in the made-up position. Additionally, the sealing surfaces 32, 34 and 36 should be finished in a manner to assure a pressure-tight joint when properly made-up power-tight. The made-up joint should also be shoulder-tight. The shoulders or sealing surfaces 32 provide the stop that positions the engaging sealing surfaces 34 and 36 in their proper interference fit. The sealing surfaces should also have a surface finish free of any defects which could cause surface galling of the mating surfaces when the joint is made-up properly. Because of the criticality of the tolerances involved in machining the sealing surfaces 32-36 and the associated threads such as the threads 18 and 28, considerable skill and know-how is required in both the tooling and machining of the present joinder means.

The general configuration of the connection means incorporating the seal group 30 could be greatly varied since the thread form and the general shape of the male and female elements is not relative to the performance of the present seal arrangement as previously explained. The overall thickness and length of the three adjacent seals of the present invention may likewise be varied to meet any particular job requirement. In addition, the present seal arrangement 30 may be utilized on well tubing and/or casing, or other pipe members regardless of whether said pipes are forged, upset, non-upset, cold or hot swagged. Additionally, other seals may likewise be incorporated into the present connector means without negating the proprietary nature of this invention such as including additional threads, teflon rings, or other additional metal seals placed in other areas of the subject connection. The present seal group 30 may also be utilized as a multiple sealing system for constraining internal and/or external pressure depending upon the location of the subject seal group in the mated connection as previously explained.

Thus there had been shown and described novel means for joining and sealingly connecting together two adjacent pipe members, which joinder means fulfills all the objects and advantages sought therefore. Many changes, modifications, variations, and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims that follow.

What is claimed is:

1. Connector means for joining together two adjacent pipe members comprising a male member having an externally threaded portion associated therewith and an unthreaded annular portion positioned axially adjacent said threaded portion, a female member having an internally threaded portion associated therewith adaptable for cooperatively engaging the threaded portion of said male member, said female member including a corresponding unthreaded annular portion positioned axially adjacent said female threaded portion, each of said unthreaded portions including a group of three complementary annular sealing surfaces having a first surface angularly positioned relative to the longitudinal axis of said pipe members such that said first surface is angularly displaced therefrom in the range from between approximately 90° to 125°, a second surface located adjacent to said first surface, said second surface being angularly positioned relative to the longitudinal axis of said pipe members such that said second surface lies in a plane substantially parallel to the longitudinal axis of said pipe members, and a third surface located adjacent to said second surface, said third surface being angularly positioned relative to the longitudinal axis of said pipe members such that the angular displacement of said third surface relative to said longitudinal axis is greater than the angular displacement of said second surface relative to said longitudinal axis, the second surface associated with each of said group of three sealing surfaces being disposed between said first and third surfaces, and unthreaded portions being positioned respectively on said male and female members such that when said male and female members are threadingly secured together the sealing surfaces associated respectively therewith sealingly engage one another to form three independent adjacent pressure-tight seals.

2. The connector means defined in claim 1 wherein the three adjacent sealing surfaces associated with said male member are positioned axially forward of said male threaded portion, and wherein the three complementary adjacent sealing surfaces associated with said female member are positioned axially rearward of said female threaded portion.

3. The connector means defined in claim 1 wherein the three adjacent sealing surfaces associated with said male member are positioned axially rearward of said male threaded portion, and wherein the three complementary adjacent sealing surfaces associated with said female member are positioned axially forward of said female threaded portion.

4. The connector means defined in claim 1 wherein said female member is incorporated into a coupling connector, said coupling connector having a female member positioned on both opposite ends thereof.

5. The connector means defined in claim 1 wherein said second surface forms an angle in the range from between approximately 0° to 20° with a plane parallel to the longitudinal axis of said pipe members.

6. The connector means defined in claim 1 wherein the threaded portions associated with said male and female members are correspondingly tapered.

7. The connector means defined in claim 1 wherein said three adjacent sealing surfaces are positioned and arranged on said male and female members respectively so as to form an externally shouldered connection.

8. The connector means defined in claim 1 wherein said three adjacent sealing surfaces are positioned and arranged on said male and female members respectively so as to form an internally shouldered connection.

9. The connector means defined in claim 1 wherein said three adjacent sealing surfaces are positioned and arranged axially adjacent both opposite ends of the threaded portion associated respectively with said male and female members so as to form an internally shouldered connection adjacent the terminal end of said male member and an externally shouldered connection adjacent the terminal end of said female member.

10. Joinder means for connecting together two adjacent pipe members in fluid/pressure tight relationship with each other, said joinder means including a male element having an externally threaded end portion and a female element having an internally threaded end portion cooperatively engageable with the threaded portion of said male element, said male element having a group of three adjacent sealing surfaces positioned axially forward of said male threaded portion and said female element having a group of three adjacent complementary sealing surfaces positioned axially rearward of said female threaded portion, each of said group of three adjacent sealing surfaces including a first surface angularly positioned relative to the longitudinal axis of said pipe members such that said first surface is angularly displaced therefrom in the range from between approximately 90° to 125°, a second surface located adjacent to said first surface, said second surface being angularly positioned relative to the longitudinal axis of said pipe members such that said second surface is angularly displaced therefrom in the range from between approximately 0° to 20°, and a third surface located adjacent to said second surface, said third surface being angularly positioned relative to said second surface such that said third surface is angular displacement therefrom in the range from approximately 10° to 75°, the second surface associated with each of said group of three adjacent sealing surfaces being disposed between said first and third surfaces, said group of three adjacent sealing surfaces being positioned respectively on said male and female elements such that when said male and female elements are threadingly secured together the sealing surfaces associated therewith sealingly engage one another to form three independent adjacent pressure-tight seals.

11. The joinder means defined in claim 10 wherein said female element is incorporated into a coupling connector, said coupling connector having a female element positioned on both opposite ends thereof.

12. The joinder means defined in claim 10 including a group of three adjacent sealing surfaces positioned axially rearward of said male threaded portion and a corresponding group of three adjacent complementary sealing surfaces positioned axially forward of said female threaded portion, said groups of adjacent sealing surfaces being arranged such that when said male and female elements are threadingly secured together, said sealing surfaces form an internally shouldered connection adjacent the terminal end of said male element and an externally shouldered connection adjacent the terminal end of said female element.

13. Joinder means for connecting together two adjacent pipe members in fluid/pressure tight relationship with each other, said joinder means including a male element having an externally threaded end portion and a female element having an externally threaded end portion cooperatively engageable with the threaded portion of said male element, said male element having a group of three adjacent sealing surfaces positioned axially rearward of said male threaded portion and said female element having a group of three adjacent complementary sealing surfaces positioned axially forward of said female threaded portion, each of said group of three adjacent sealing surfaces including a first surface angularly positioned relative to the longitudinal axis of said pipe members such that said first surface is angularly displaced therefrom in the range from between approximately 90° to 125°, a second surface located adjacent to said first surface, said second surface being angularly positioned relative to the longitudinal axis of said pipe members such that said second surface is angularly displaced therefrom in the range from between approximately 0° to 20°, and a third surface located adjacent to said second surface, said third surface being angularly positioned relative to said second surface such that said third surface is angular displacement therefrom in the range from approximately 10° to 75°, the second surface associated with each of said group of three adjacent sealing surfaces being disposed between said first and third surfaces, said group of three adjacent sealing surfaces being positioned respectively on said male and female elements such that when said male and female elements are threadingly secured together the sealing surfaces associated therewith sealingly engage one another to form three independent adjacent pressure-tight seals.

14. The joinder means defined in claim 13 wherein said female element is incorporated into a coupling connector, said coupling connector having a female element positioned on both opposite ends thereof.

* * * * *